United States Patent
Lee et al.

(10) Patent No.: US 12,448,596 B2
(45) Date of Patent: Oct. 21, 2025

(54) SCAFFOLD FOR CELL CULTURE AND MANUFACTURING METHOD THEREOF

(71) Applicant: Sea With Inc., Daegu (KR)

(72) Inventors: Hee Jae Lee, Daegu (KR); Joon Ho Keum, Daegu (KR); Ha Rim Jang, Seoul (KR); Min Young Kim, Daegu (KR); Sang Hyun Song, Naju (KR); Tae Keun Jeong, Busan (KR)

(73) Assignee: Sea With Inc., Daegu (KR)

( * ) Notice: Subject to any disclaimer, the term of this patent is extended or adjusted under 35 U.S.C. 154(b) by 697 days.

(21) Appl. No.: 17/771,459

(22) PCT Filed: Oct. 16, 2020

(86) PCT No.: PCT/KR2020/014149
§ 371 (c)(1),
(2) Date: Apr. 23, 2022

(87) PCT Pub. No.: WO2021/125529
PCT Pub. Date: Jun. 24, 2021

(65) Prior Publication Data
US 2023/0014960 A1    Jan. 19, 2023

(30) Foreign Application Priority Data
Dec. 19, 2019  (KR) .................. 10-2019-0170537

(51) Int. Cl.
| | | |
|---|---|---|
| *A01G 33/00* | (2006.01) | |
| *C12M 1/00* | (2006.01) | |
| *C12M 1/12* | (2006.01) | |
| *C12N 5/00* | (2006.01) | |

(52) U.S. Cl.
CPC .......... *C12M 25/14* (2013.01); *C12N 2500/76* (2013.01); *C12N 2533/74* (2013.01); *C12N 2533/78* (2013.01)

(58) Field of Classification Search
CPC ........ C12M 23/20; C12M 1/12; C12M 25/14; C12N 5/0068; C12N 5/0062; C12N 2500/76; C12N 2533/74; C12N 2533/78; A01G 33/00
See application file for complete search history.

(56) References Cited

FOREIGN PATENT DOCUMENTS

JP        2019-509723 A      4/2019

OTHER PUBLICATIONS

Aarstad et al. Mechanical Properties of Composite Hydrogels of Alginate and Cellulose Nanofibrils. Polymers (2017), 9, 378. (Year: 2017).*
Berglund et al. Utilizing the Natural Composition of Brown Seaweed for the Preparation of Hybrid Ink for 3D Printing of Hydrogels. Applied Bio Materials (Aug. 2020), 3, 6510-6520. (Year: 2020).*
Rose et al. Nerve Cells Decide to Orient inside an Injectable Hydrogel with Minimal Structural Guidance. Nano Lett.(2017), 17, 3182-3791. (Year: 2017).*
Chen et al. Production of new cellulose nanomaterial from red algae marine biomass Gelidium elegans.Carbohydrate Polymers (2016), 151, 1210-1219. (Year: 2016).*
Gepp et al. Bioactive surfaces from seaweed-derived alginates for the cultivation of human stem cells. J Appl Phycol (2017) 29:2451-2461. (Year: 2017).*
Gershlak, Jr. et al., Biomaterials (2017) 12513-22.

* cited by examiner

*Primary Examiner* — Sean C. Barron
(74) *Attorney, Agent, or Firm* — Harvest IP Law, LLP

(57) ABSTRACT

The present invention relates to a cell culture scaffold, and provides a cell culture scaffold which has a hydrogel structure comprising alginate and cellulose extracted by means of algae decellularization and which enable the stable growth of cells even at low cost while having a simple preparation.

11 Claims, 4 Drawing Sheets

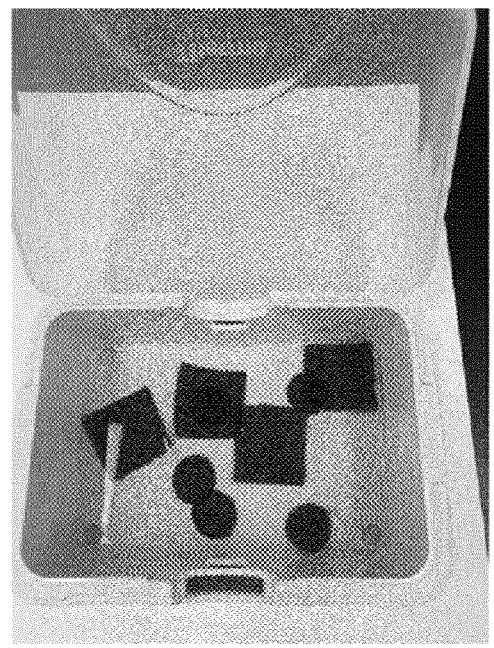
Fig.2
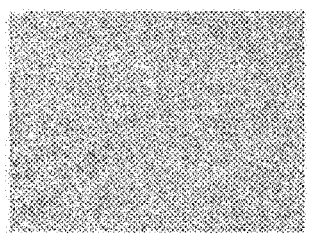 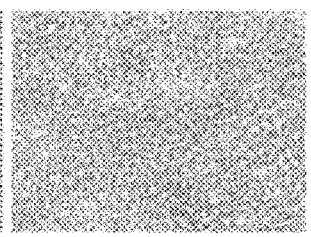
Fig.3(a)　　　Fig.3(b)
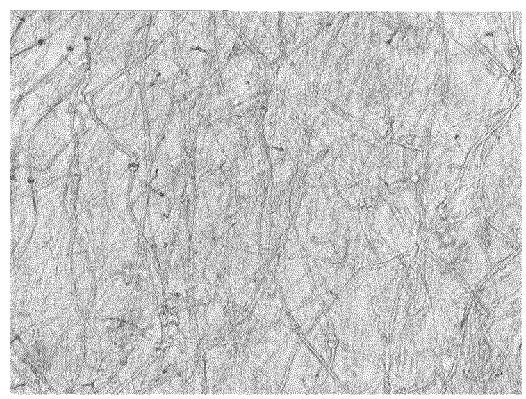
Fig.4

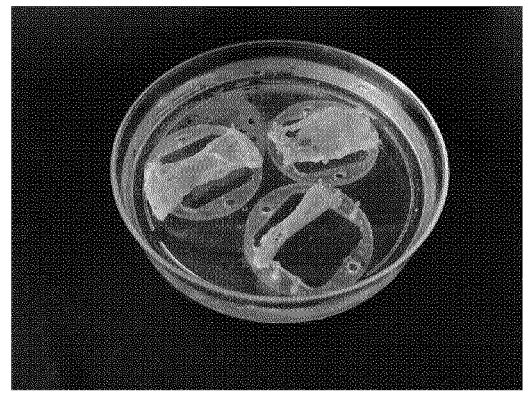
Fig.5
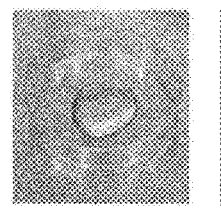 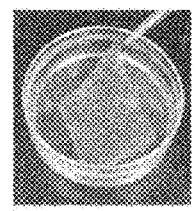
Fig.6(a)　　Fig.6(b)
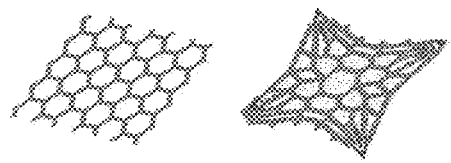
Fig.7(a)　　Fig.7(b)

SCAFFOLD FOR CELL CULTURE AND MANUFACTURING METHOD THEREOF

CROSS REFERENCE TO RELATED APPLICATIONS

This application is a National Stage of International Application No. PCT/KR2020/014149 filed Oct. 16, 2020, claiming priority based on Korean Patent Application No. 10-2019-0170537 filed Dec. 19, 2019, the disclosures of which are incorporated herein by reference in their entireties.

TECHNICAL FIELD

The present invention relates to a cell culture scaffold and a method of producing the same, and more particularly to a cell culture scaffold capable of supporting the growth of cells and a method of producing the same.

BACKGROUND ART

Cell culture, which is a fundamental operation in the life sciences, is essential not only to understand living things but also for experiments to conquer diseases as a basis for research on intercellular signal transduction, cell differentiation, and the like. These days, the use of cell culture has expanded beyond the scope of research on the function of living things or human diseases, and is being widely applied even to growth of edible cells.

In order for cells to grow through cell culture, an area in which cells are capable of being stably settled is fundamentally required, and it is common to use a two-dimensional Petri dish made of polystyrene or glass.

However, because cells grown in two dimensions are substantially different from living tissues, thorough research into three-dimensional cell culture scaffolds is ongoing to meet the increase in the demand for the growth of cells in the form of a three-dimensional mass.

A three-dimensional cell culture scaffold has to possess basic requirements such as biocompatibility, bioactivity, biomechanics, and the like. Specifically, the cell culture scaffold has to enable cells to be securely attached thereto, to sufficiently support the growth of cells, to supply oxygen and nutrients without limitation, and to have an open structure for discharging waste.

Methods of producing a cell culture scaffold that satisfy these basic requirements include particle leaching, emulsion freeze-drying, high-pressure gas expansion, phase separation, and electrospinning.

The cell culture scaffold thus produced is commercially available in the form of a hydrogel containing an artificially synthesized polymer as a main component. However, a cell culture scaffold is relatively expensive and is thus used very limitedly due to the economic burden on research institutes or related fields in which it is essential to use the same.

Currently, the fields of use of cell culture scaffolds go beyond specialized laboratories researching life sciences and are expanding to food tech, that is, the field of making cultured meat grown through cell culture without sacrificing animals. In particular, this food tech is near-future food technology that will solve ethical problems caused by animal sacrifice and environmental pollution that occurs during the livestock breeding process. The cell culture scaffold, which will become the basic cornerstone of food tech, needs continued R&D in order to improve cell growth environments and reduce production costs.

DISCLOSURE

Technical Problem

Accordingly, the present invention has been made keeping in mind the problems encountered in the related art, and an object of the present invention is to provide a cell culture scaffold capable of three-dimensional cell growth using a complex material extracted through decellularization of seaweed and a method of producing the same.

The objects of the present invention are not limited to the foregoing, and other objects not mentioned herein will be able to be clearly understood by those skilled in the art from the following description.

Technical Solution

In order to accomplish the objects and other features of the present invention, an aspect of the present invention provides a cell culture scaffold having a hydrogel structure including alginate and cellulose extracted through decellularization of seaweed.

In the present invention, the seaweed preferably includes at least one selected from among *Undaria pinnatifida, Saccharina japonica, Monostroma nitidum, Sargassum fusiforme, Sargassum fulvellum*, and *Gloiopeltis tenax*.

In order to accomplish the objects and other features of the present invention, another aspect of the present invention provides a method of producing a cell culture scaffold including pretreating seaweed to be treated, immersing the pretreated seaweed in a solution containing an anionic detergent, separating a cortex layer by slowly shaking the solution in which the seaweed is immersed, washing a medullar layer separated from the cortex layer with PBS (phosphate-buffered saline), gelling the washed medullar layer, and freeze-drying the gelled medullar layer to form a cell culture scaffold.

In the present invention, the pretreating the seaweed to be treated preferably includes preparing a pretreatment solution by dissolving 1-3% (w/v) sodium chloride (NaCl) in distilled water, immersing the seaweed in the pretreatment solution and performing ozone treatment, and cutting the seaweed to a predetermined size.

In the present invention, in the immersing the pretreated seaweed in the solution containing the anionic detergent, the concentration of an aqueous solution is preferably 1-5% (w/v).

In the present invention, the gelling the washed medullar layer preferably includes immersing the washed medullar layer in a 0.5-10% (w/v) calcium chloride ($CaCl_2$) aqueous solution and washing the medullar layer with PBS after immersion for a predetermined time.

In the present invention, the immersing the washed medullar layer and the washing the medullar layer are preferably repeated at least twice.

In the present invention, the method preferably further includes sterilizing the scaffold that is freeze-dried and fabricating the scaffold in a predetermined shape.

In the present invention, the seaweed preferably includes at least one selected from among *Undaria pinnatifida, Saccharina japonica, Monostroma nitidum, Sargassum fusiforme, Sargassum fulvellum*, and *Gloiopeltis tenax*.

In order to accomplish the objects and other features of the present invention, still another aspect of the present invention provides a method of culturing a cell using a cell culture scaffold including providing a cell culture scaffold, spraying a seed cell solution on the cell culture scaffold, and culturing a seed cell contained in the seed cell solution.

In the present invention, in the spraying the seed cell solution, the density of the seed cell contained in the seed cell solution that is sprayed is preferably $1*10^6$ to $1*10^8$ cells/ml.

Advantageous Effects

According to the present invention, a cell culture scaffold and a method of producing the same provide the following effects.

The present invention is effective at creating an optimal environment in which various types of cells are capable of stably growing using a cell culture scaffold composed mainly of seaweed.

The present invention is effective at eliminating the expense incurred to remove the cell culture scaffold because both the fully grown cells and the cell culture scaffold can be ingested without the need to remove the cell culture scaffold when edible cells are cultured and finally ingested.

The present invention is effective at increasing price competitiveness by greatly reducing the cost of production of the cell culture scaffold because it is possible to produce a cell culture scaffold through decellularization using seaweed.

The effects of the present invention are not limited to the foregoing, and other effects not mentioned herein will be able to be clearly understood by those skilled in the art from the following description.

DESCRIPTION OF DRAWINGS

FIG. 2 shows a photograph of *Undaria pinnatifida* that is cut in FIG. 1;

FIGS. 3a and 3b show micrographs before and after SDS treatment in FIG. 1;

FIG. 4 shows a micrograph of the medullar layer from which the cortex layer is separated;

FIG. 5 shows a photograph of the medullar layer of *Undaria pinnatifida* during washing with PBS in FIG. 1;

FIGS. 6a and 6b show photographs of the medullar layer before and after gelation in FIG. 1;

FIGS. 7a and 7b schematically show a hydrogel structure including alginate and cellulose that constitute a cell culture scaffold obtained through the production process of FIG. 1.

MODE FOR INVENTION

Since the description of the present invention is merely a structural or functional description of an embodiment, the scope of the present invention should not be construed as being limited by the embodiment described herein. Specifically, since the embodiment may be variously modified and may have various forms, it should be understood that the scope of the present invention includes equivalents capable of realizing the technical idea. In addition, since the objects or effects of the present invention do not mean that a specific embodiment should realize all of them or should not realize any additional effects, it should not be understood that the scope of the present invention is limited in relation thereto.

Hereinafter, a cell culture scaffold according to an embodiment of the present invention is described.

The cell culture scaffold according to an embodiment of the present invention has a hydrogel structure including alginate and cellulose extracted through decellularization of seaweed.

The seaweed is maintained in a half-gel state in which alginate and cellulose are entangled. As will be explained later, cellulose has a dense network structure and alginate has viscous molecules, thereby providing an optimal environment for the growth of plant and animal cells. Moreover, since the hydrogel structure obtained using the method of producing a cell culture scaffold according to an embodiment of the present invention has a solid phase, it is easier to change the shape thereof into a desired form by a producer than other conventional substrates in a gel state, so it is very suitable for processing and commercialization in a form necessary for cell growth.

Figure 1:
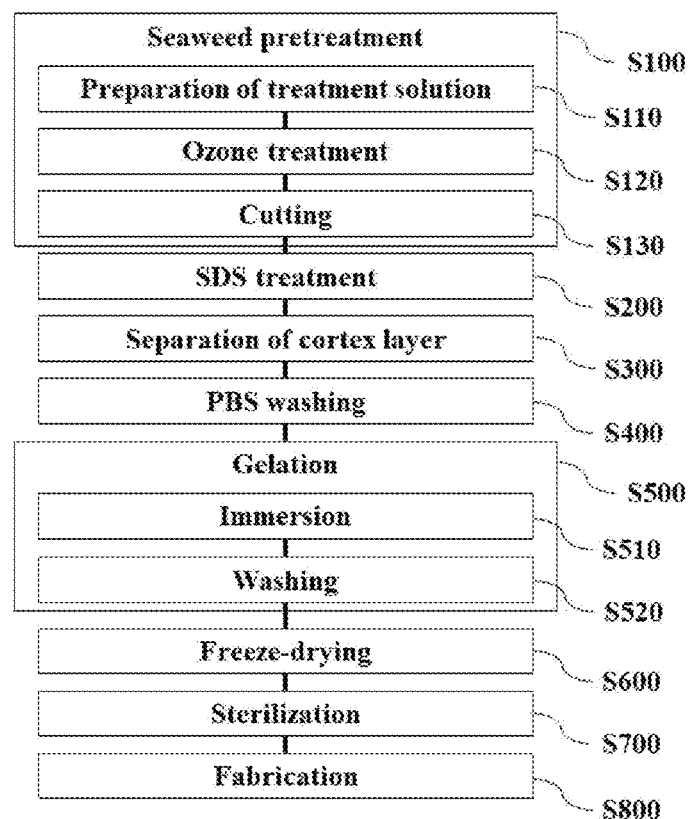
FIG. 1 shows a flowchart of a process of producing a cell culture scaffold according to an embodiment of the present invention.

FIG. 1 shows a flowchart of the process of producing a cell culture scaffold according to an embodiment of the present invention.

Before the description, the seaweed according to an embodiment of the present invention includes at least one selected from among *Undaria pinnatifida, Saccharina japonica, Monostroma nitidum, Sargassum fusiforme, Sargassum fulvellum*, and *Gloiopeltis tenax*. For the sake of explanation, below, production of a cell culture scaffold by extracting the extracellular matrix through decellularization of *Undaria pinnatifida* will be exemplified.

With reference to FIG. 1, the method of producing a cell culture scaffold includes seaweed pretreatment (S100), SDS treatment (S200), separation of a cortex layer (S300), PBS washing (S400), gelation (S500), freeze-drying (S600), sterilization (S700), and fabrication (S800).

First, the seaweed pretreatment (S100) is a pretreatment process for inducing decellularization of *Undaria pinnatifida* to be treated, and includes preparation of a pretreatment solution (S110), ozone treatment (S120), and cutting (S130).

Here, the preparation of the pretreatment solution (S110) is a process of preparing a pretreatment solution for properly swelling the tissue of *Undaria pinnatifida*. The pretreatment solution is prepared by dissolving 1-3% (w/v) sodium chloride (NaCl) in distilled water, and a pretreatment solution having a sodium chloride concentration of 1 to 2% (w/v) is preferably used.

If the concentration of sodium chloride (NaCl) is too high, damage to *Undaria pinnatifida* may occur because the tissue of the immersed *Undaria pinnatifida* may swell excessively due to osmotic pressure. On the other hand, if the concentration of sodium chloride (NaCl) is too low, the immersed *Undaria pinnatifida* may not swell sufficiently, or post-processing for separating the layer structure of *Undaria pinnatifida* may be impossible.

The ozone treatment (S120) is a process of immersing *Undaria pinnatifida* in the pretreatment solution and performing ozone treatment. Here, *Undaria pinnatifida* is irradiated with ozone for about 60 to 90 seconds, whereby microorganisms present on the surface of *Undaria pinnatifida* are killed.

The cutting (S130) is a process of cutting *Undaria pinnatifida* to a predetermined size. Through the cutting (S130), *Undaria pinnatifida* may have, for example, a rectangular or circular shape having a predetermined size, as shown in FIG.

2, and the size and shape of *Undaria pinnatifida* that is cut may vary depending on the purpose of the final cell culture scaffold.

Referring back to FIG. 1, treatment with SDS (sodium dodecyl sulfate) as an anionic detergent (S200) is a process of immersing *Undaria pinnatifida* pretreated in the seaweed pretreatment (S100) in an SDS aqueous solution. The concentration of the SDS aqueous solution that is used typically falls in the range of 1 to 5% (w/v), and an SDS aqueous solution having a concentration of 1 to 2% (w/v) is preferably used when *Undaria pinnatifida* is immersed. In addition to the SDS detergent, it is also possible to use any one of anionic detergents such as Triton X-100, PEG (polyethylene glycol), and the like.

FIG. 3(A) shows a micrograph before immersing *Undaria pinnatifida* in the SDS aqueous solution, and FIG. 3(B) shows a micrograph after immersing *Undaria pinnatifida* in the SDS aqueous solution. As shown in FIG. 3, the density of the cortex tissue of *Undaria pinnatifida* is observed to decrease after SDS treatment compared to beforehand.

Referring back to FIG. 1, the separation of the cortex layer (S300) is a process of separating the cortex layer of *Undaria pinnatifida* after treatment with the anionic detergent. The separation of the cortex layer (S300) is carried out by slowly shaking the SDS aqueous solution in which *Undaria pinnatifida* is immersed for 15 to 30 minutes, and through this process, the cortex layer densely arranged in *Undaria pinnatifida* and the medullar layer having a loose cellulose structure are separated from each other.

FIG. 4 shows a micrograph of the medullar layer from which the cortex layer is separated. As will be described later, this medullar layer is the basis of the hydrogel structure of the cell culture scaffold according to an embodiment of the present invention.

Referring back to FIG. 1, the PBS (phosphate-buffered saline) washing (S400) is a process of washing, using PBS, the medullar layer remaining after removing the cortex layer in the separation of the cortex layer (S300). FIG. 5 shows the medullar layer of *Undaria pinnatifida* during washing with PBS.

Referring back to FIG. 1, the gelation (S500) is a process of gelling the medullar layer washed in the PBS washing (S400), and includes immersion (S510) and washing (S520).

Here, the immersion (S510) is a process of immersing the medullar layer in a calcium chloride ($CaCl_2$) aqueous solution. The concentration of calcium chloride ($CaCl_2$) in the aqueous solution is preferably 0.5 to 10% (w/v), and the appropriate immersion time is about 1 to 10 minutes. The treatment concentration and time may vary depending on the type of three-dimensional cell scaffold and the type of cell to be cultured.

Through this process, $Ca^{2+}$ cations in the aqueous solution are used for cross-linking of alginate, and the stiffness of the gel varies depending on the extent of cross-linking.

Subsequently, the washing (S520) is a process of washing, using PBS, the medullar layer taken out of the aqueous solution after immersion (S510) for a predetermined time.

After the immersion (S510) and the washing (S520) with regard to the gelation (S500), the medullar layer takes on a transparent gel state as shown in FIG. 6(A), and when the immersion (S510) and the washing (S520) are repeated, the opaque film is peeled off from the medullar layer to form a transparent structure, and after completion of gelation, the form shown in FIG. 6(B) results.

Referring back to FIG. 1, the freeze-drying (S600) is a process of freeze-drying the medullar layer gelled in the gelation (S500), and the gelled medullar layer is freeze-dried for about 1 day using a typical freeze-dryer, and is formed into a scaffold, which is a basic type of cell culture scaffold according to an embodiment of the present invention.

The scaffold thus completed is additionally subjected to sterilization (S700) and fabrication (S800). Here, the sterilization (S700) is a process of sterilizing the freeze-dried scaffold through steam sterilization using hydrogen peroxide ($H_2O_2$) or UV sterilization, and the fabrication (S800) is a process of changing the shape of the scaffold thus sterilized so as to be suitable for cell culture. Here, the scaffold may be in any shape, such as a circular shape, a rectangular shape, etc.

Consequently, it is possible to obtain a cell culture scaffold in a desired form through the production method described above.

Meanwhile, since the cell culture scaffold according to an embodiment of the present invention is able to mimic a joint vascular network, problems related to hypoxia do not occur even when the size of the three-dimensional construct increases.

As described above, the cell culture scaffold according to an embodiment of the present invention may be provided with a hydrogel structure including alginate and cellulose merely through simple decellularization.

FIG. 7 schematically shows the hydrogel structure formed with a complex of alginate and cellulose for the cell culture scaffold obtained through the production process of FIG. 1.

With reference to FIG. 7, (A) is a basic form of the hydrogel structure including alginate and cellulose, and (B) is the form when tension is applied to the hydrogel structure including alginate and cellulose.

As can be seen in (A) of FIG. 7, the hydrogel structure including alginate and cellulose has relatively tough and hard physical properties because it has a network structure, and even when physical tension is applied thereto, as shown in (B) of FIG. 7, the network bond is not easily broken.

In particular, as shown in (B), the hydrogel including alginate and cellulose to which physical tension is applied is aligned unidirectionally, so cells to be subsequently sprayed thereon may also be aligned, which aids in functional differentiation of certain cell types such as muscles and also is able to improve the taste of fully grown cultured meat.

Meanwhile, the cell culture scaffold according to an embodiment of the present invention may be used as a scaffold for culturing seed cells by spraying a seed cell solution containing the seed cells thereon. Here, the density of the seed cells contained in the seed cell solution is at least $1*10^6$ to $1*10^8$ cells/ml, and may vary depending on the purpose of use of fully grown cells.

Subsequently, the seed cells thus sprayed may naturally penetrate pores in the hydrogel including alginate and cellulose due to a capillary phenomenon.

Figure 8:
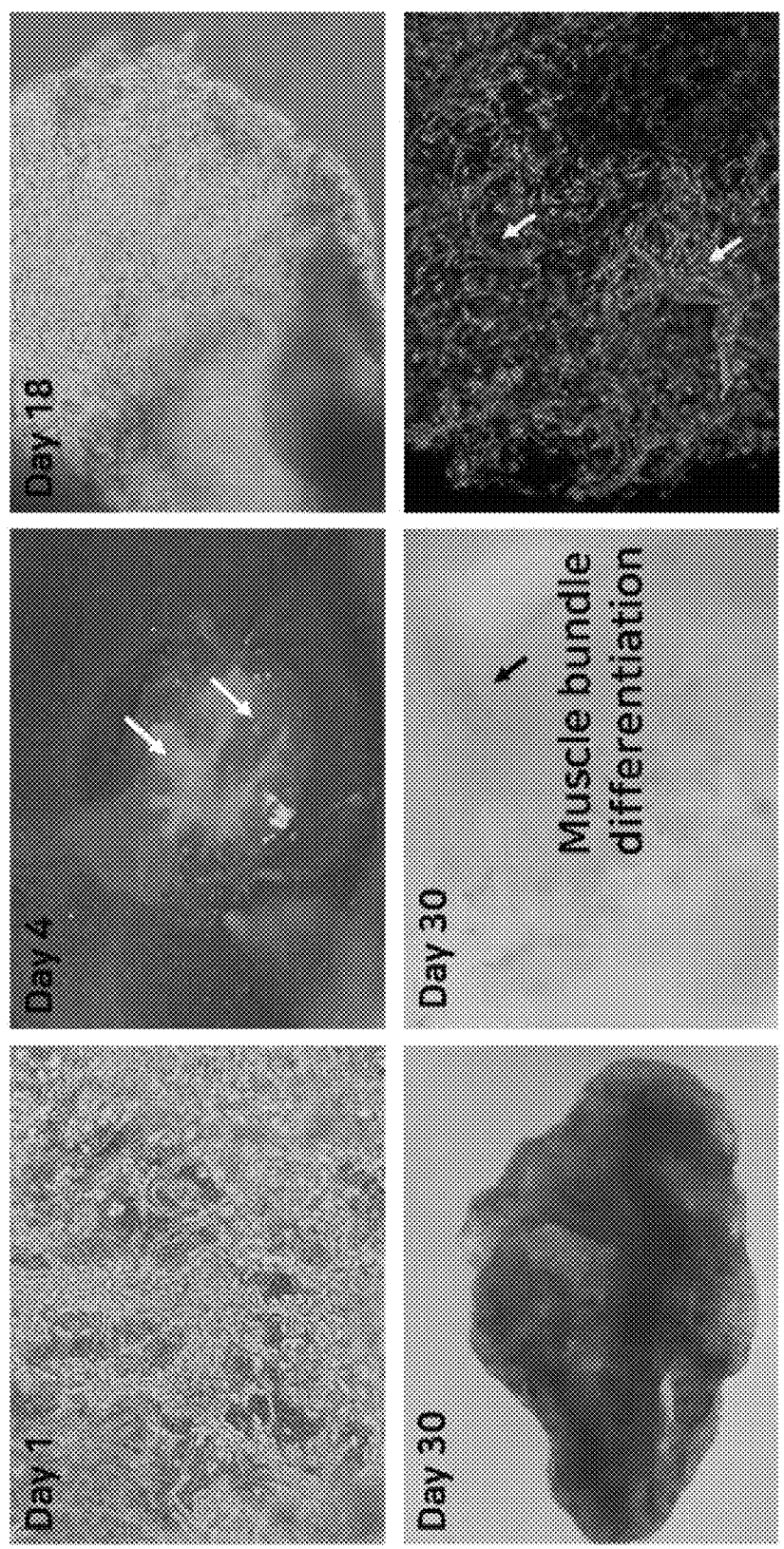
FIG. 8 shows the growth of seed cells cultured in the cell culture scaffold according to an embodiment of the present invention.

FIG. 8 shows the growth of the seed cells cultured in the cell culture scaffold according to an embodiment of the present invention.

With reference to FIG. 8, it can be seen that the seed cells sprayed on the cell culture scaffold become integrated with the cell culture scaffold in the order of day 1, day 4, day 18, and day 30, and the size of the resulting construct gradually increases, and differentiation of muscle bundles can also be observed on day 30 (arrows).

In conclusion, the cell culture scaffold according to an embodiment of the present invention can be obtained using a complex of alginate and cellulose extracted through decellularization of seaweed, and the low-cost cell culture scaffold thus obtained enables stable growth of various types of cells.

Moreover, in the culture of animal edible cells using the cell culture scaffold, when fully grown cultured meat is ingested by a consumer, both the cultured meat and the cell culture scaffold can be ingested, obviating the need to remove the cell culture scaffold. This is because the composition of the cell culture scaffold according to an embodiment of the present invention is based on edible seaweed. Therefore, when a finished product is obtained by culturing edible cells, the process of removing the cell culture scaffold can be eliminated, which means that production costs can be reduced corresponding thereto.

The embodiments described in this specification and the accompanying drawings are merely illustrative of some of the technical ideas included in the present invention. Therefore, since the embodiments disclosed in the present specification are for explanation rather than limitation of the technical spirit of the present invention, it is obvious that the scope of the technical spirit of the present invention is not limited by these embodiments. Modifications and specific embodiments that can be easily inferred by those skilled in the art within the scope of the technical spirit included in the specification and drawings of the present invention should be construed as being included in the scope of the present invention.

The invention claimed is:

1. A cell culture scaffold having a hydrogel structure comprising alginate and cellulose,
    wherein the alginate and cellulose are derived from a seaweed that is extracted through a decellularization process, the process removes a cortex layer of the seaweed and retains a medulla layer of the seaweed,
    wherein the medullar layer is the basis of the hydrogel structure,
    the hydrogel structure is a network that is unidirectionally aligned so cells to be sprayed on the hydrogel structure will also be aligned,
    wherein a density of the cells is $1*10^6$ to $1*10^8$ cells/ml, and
    the scaffold is helpful in functional differentiation of cells.

2. The cell culture scaffold of claim 1, wherein the seaweed comprises at least one selected from among *Undaria pinnatifida, Saccharina japonica, Monostroma nitidum, Sargassum fusiforme, Sargassum fulvellum, and Gloiopeltis tenax*.

3. A method of producing a cell culture scaffold of claim 1, comprising: pretreating seaweed to be treated; immersing the pretreated seaweed in a solution containing an anionic detergent; separating a cortex layer by slowly shaking the solution in which the seaweed is immersed; washing a medullar layer separated from the cortex layer with PBS (phosphate-buffered saline); gelling the washed medullar layer; and freeze-drying the gelled medullar layer to form a cell culture scaffold.

4. The method of claim 3, wherein the pretreating the seaweed to be treated comprises: preparing a pretreatment solution by dissolving 1-3% (w/v) sodium chloride (NaCl) in distilled water; immersing the seaweed in the pretreatment solution and performing ozone treatment; and cutting the seaweed to a predetermined size.

5. The method of claim 3, wherein, in the immersing the pretreated seaweed in the solution containing the anionic detergent, a concentration of an aqueous solution is 1-5% (w/v).

6. The method of claim 3, wherein the gelling the washed medullar layer comprises: immersing the washed medullar layer in a 0.5-10% (w/v) calcium chloride ($CaCl_2$)) aqueous solution; and washing the medullar layer with PBS after immersion for a predetermined time in the calcium chloride aqueous solution.

7. The method of claim 6, wherein the immersing the washed medullar layer in the calcium chloride aqueous solution and the washing the medullar layer with PBS are repeated at least twice.

8. The method of claim 3, further comprising: sterilizing the scaffold that is freeze-dried; and fabricating the scaffold in a predetermined shape.

9. The method of claim 3, wherein the seaweed comprises at least one selected from among *Undaria pinnatifida, Saccharina japonica, Monostroma nitidum, Sargassum fusiforme, Sargassum fulvellum, and Gloiopeltis tenax*.

10. A method of culturing a cell using a cell culture scaffold, comprising: providing the cell culture scaffold of claim 1; spraying a seed cell solution on the cell culture scaffold; and culturing a seed cell contained in the seed cell solution.

11. The method of claim 10, wherein, in the spraying the seed cell solution, a density of the seed cell contained in the seed cell solution that is sprayed is $1*10^6$ to $1*10^8$ cells/ml.

* * * * *